United States Patent [19]
Umezawa et al.

[11] Patent Number: 5,786,554
[45] Date of Patent: Jul. 28, 1998

[54] SHIFT SWITCHING DEVICE FOR TORQUE CONVERTER

[75] Inventors: Kazunori Umezawa; Kiyoshi Sashida, both of Saitama, Japan

[73] Assignee: Toyodenso Kabushiki Kaisha, Tokyo, Japan

[21] Appl. No.: 659,161

[22] Filed: Jun. 5, 1996

[30] Foreign Application Priority Data

Jun. 29, 1995 [JP] Japan ................................. 7-163465

[51] Int. Cl.$^6$ ............................. H01H 9/06; H01H 9/00; H01H 3/16
[52] U.S. Cl. ................................. 200/61.88; 200/61.54; 200/61.28
[58] Field of Search ............................. 200/61.88, 61.85, 200/61.54, 16 R, 16 B, 16 C, 16 D, 16 A, 61.27, 573, 574, 61.28

[56] References Cited

U.S. PATENT DOCUMENTS

| | | | |
|---|---|---|---|
| 3,735,070 | 5/1973 | Kreutzelman et al. | 200/78 |
| 3,829,637 | 8/1974 | Kilcoin | 200/47 |
| 3,898,401 | 8/1975 | Noba et al. | 200/16 A |
| 3,919,506 | 11/1975 | Kellogg | 200/16 A |
| 3,971,906 | 7/1976 | Sahrbacker | 200/157 |
| 4,175,221 | 11/1979 | Kellogg | 200/16 A |
| 4,273,971 | 6/1981 | Tregurtha | 200/61.27 |
| 4,315,117 | 2/1982 | Kokubu et al. | 200/61.27 |
| 4,791,253 | 12/1988 | Erdelitsch et al. | 200/61.27 |
| 4,868,352 | 9/1989 | Botz et al. | 200/4 |

*Primary Examiner*—Stuart N. Hecker
*Assistant Examiner*—Bao Q. Vu
*Attorney, Agent, or Firm*—Birch, Stewart, Kolasch & Birch, LLP

[57] ABSTRACT

A slider 13 is operated by a lever and provided with a neutral recess 23, a forward recess 24, and a reverse recess 25 which are adapted to serve as a compulsory separation means. Actuating members 16, 17, and 18 are disposed to enter the corresponding recesses and are provided with conductive plates 32, 40, and 46, respectively. Movable contacts 35, 41, and 47 are mounted on the conductive plates, whereby each movable contact is adapted to close any of the corresponding stationary contacts 36, 37, 42, 43, 48, and 49 only when each actuating member enters the corresponding neutral recess 23, forward recess 24, or reverse recess 25, while the other movable contacts are compulsorily separated from the corresponding stationary contacts.

9 Claims, 8 Drawing Sheets

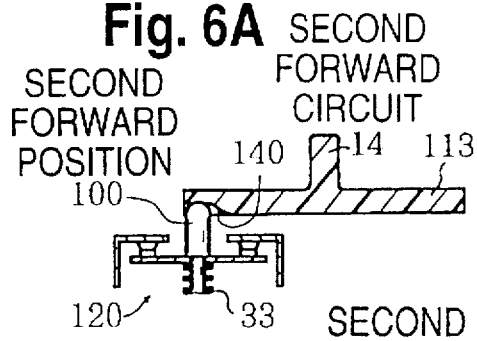
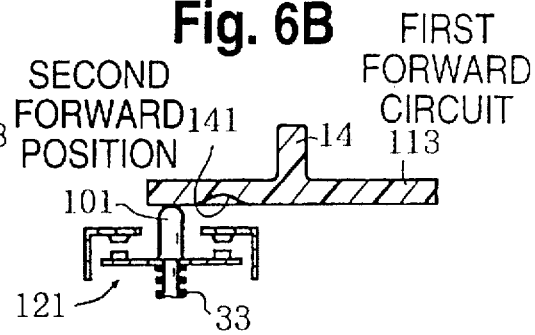
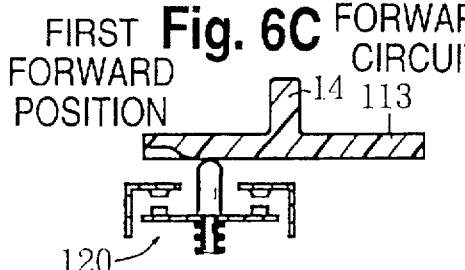
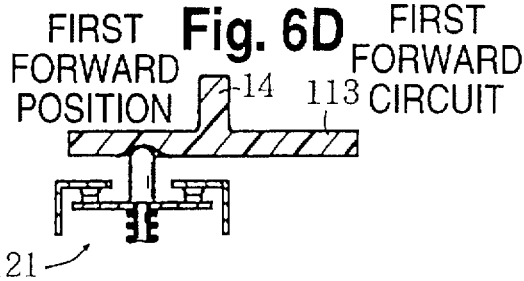
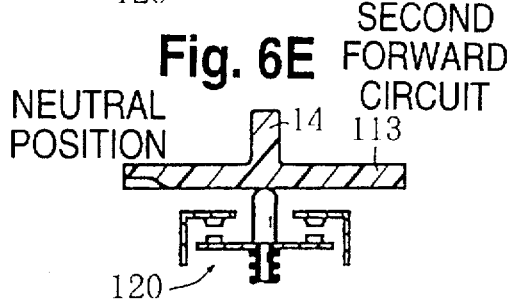
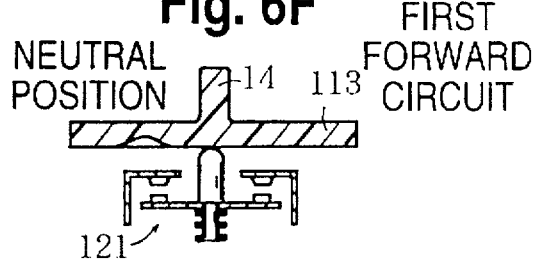
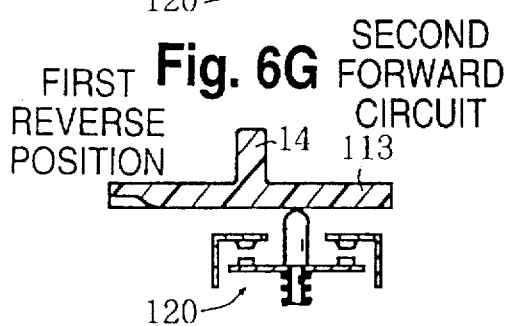
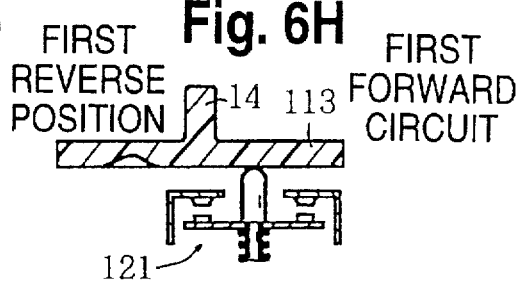
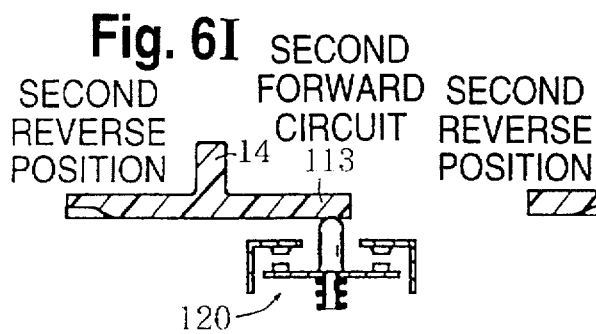
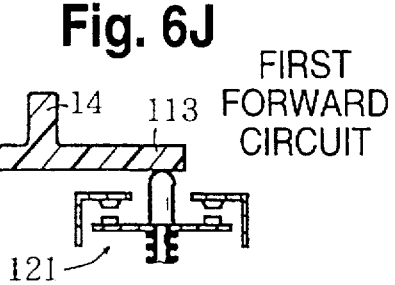

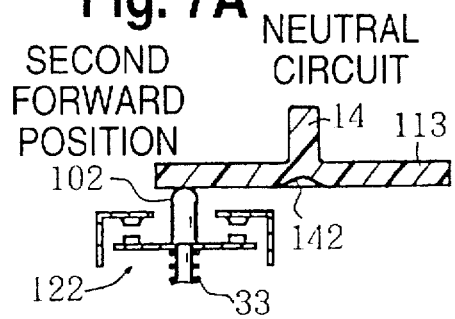

Fig. 7A SECOND FORWARD POSITION / NEUTRAL CIRCUIT

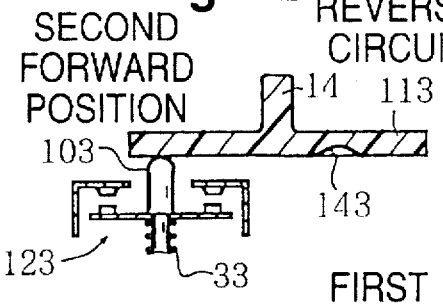

Fig. 7B SECOND FORWARD POSITION / FIRST REVERSE CIRCUIT

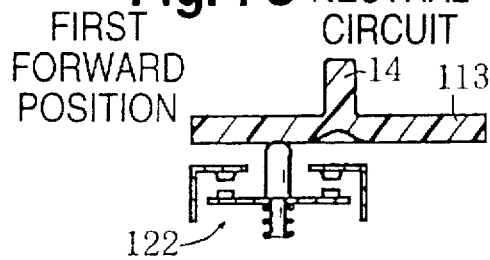

Fig. 7C FIRST FORWARD POSITION / NEUTRAL CIRCUIT

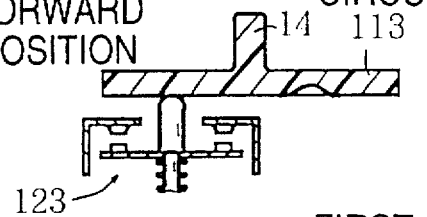

Fig. 7D FIRST FORWARD POSITION / FIRST REVERSE CIRCUIT

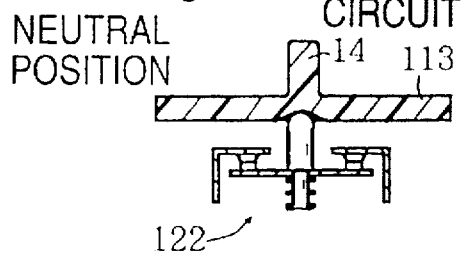

Fig. 7E NEUTRAL POSITION / NEUTRAL CIRCUIT

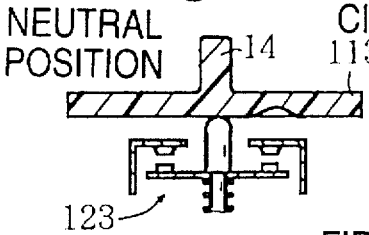

Fig. 7F NEUTRAL POSITION / FIRST REVERSE CIRCUIT

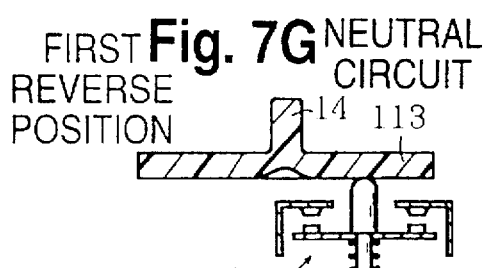

Fig. 7G FIRST REVERSE POSITION / NEUTRAL CIRCUIT

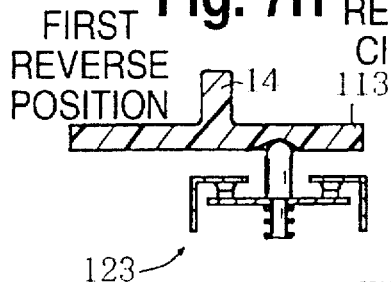

Fig. 7H FIRST REVERSE POSITION / FIRST REVERSE CIRCUIT

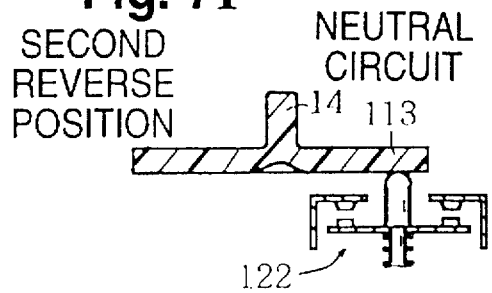

Fig. 7I SECOND REVERSE POSITION / NEUTRAL CIRCUIT

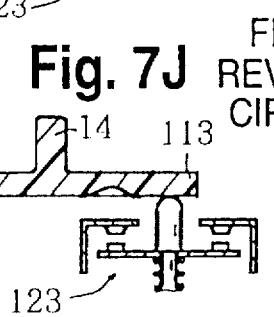

Fig. 7J SECOND REVERSE POSITION / FIRST REVERSE CIRCUIT

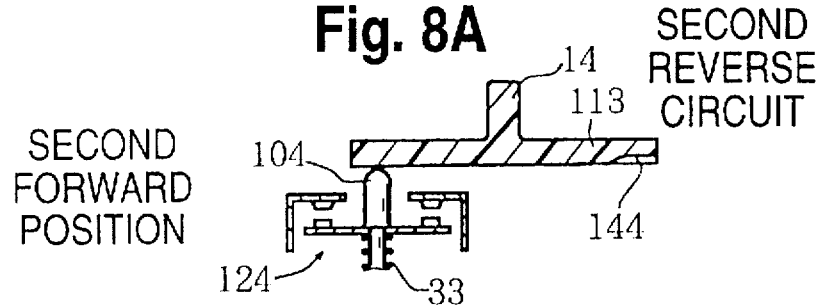
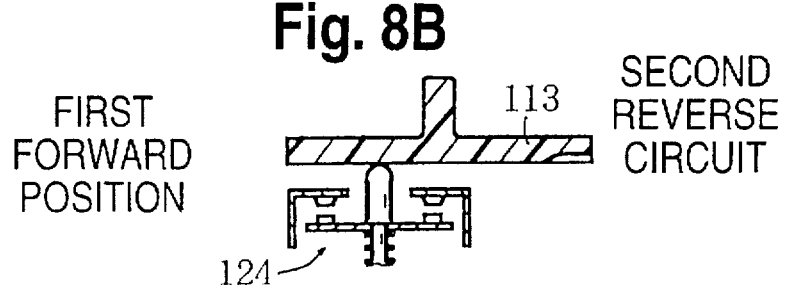
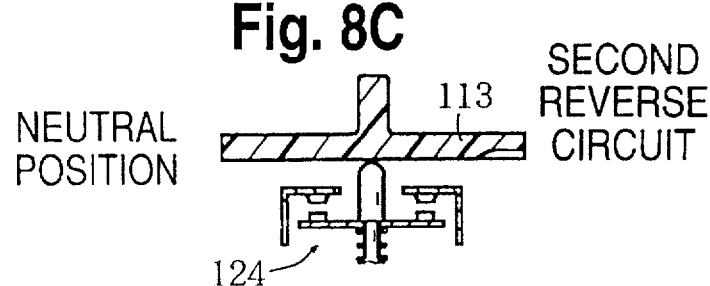
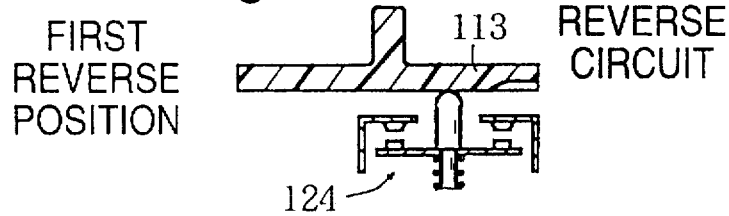
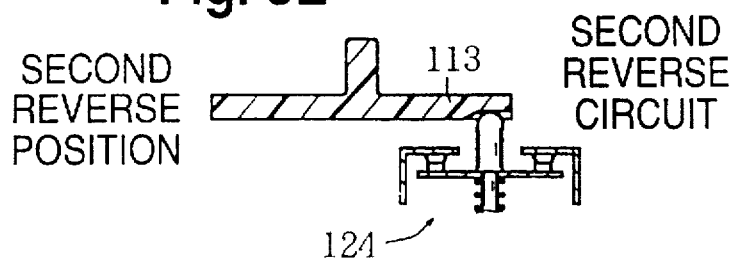

SHIFT SWITCHING DEVICE FOR TORQUE CONVERTER

BACKGROUND OF THE INVENTION

1. Field of the Invention

This invention relates to a shift switching device for a torque converter for use in industrial vehicles or the like.

2. Description of Background Art

Conventionally, it is common in the art for industrial vehicles to have a floorshift type torque converter. A shift lever is provided which may be operated to switch on and off a shift switch such as hydraulic control valves disposed in a line along the rotational locus of the lever independently of each shift position.

Now, when a column-shift type converter is required instead, rotational movement of the lever is confined to a very small area. It is therefore necessary to have at least three circuits, neutral, forward and reverse, in parallel within one shift switch, and these must be switched at the same time by the rotation of the lever.

However, because there is a possibility of causing a contact seizure due to a relatively high flow of electricity to each circuit, it is necessary to prevent the contact from undergoing such a seizure so as to improve both the reliability and the durability in practical use. Also, a plurality of positions may be needed in response to the torque in the forward and reverse circuits. In this case, it is also necessary to provide a compact shift switch.

It is therefore an object of the present invention to provide an improved shift switching device.

SUMMARY OF THE INVENTION

The present invention provides a shift switching device for a torque converter, which comprises a lever for shifting the output of the torque converter to at least a neutral, forward or reverse movement. A slider disposed to link with the lever. At least three position circuits are adapted to be closed or opened by the movement of the slider and are independent in neutral, forward or reverse movement. Each position circuit includes an actuating member which moves in a link motion with the slider, a movable contact which moves integrally with the actuating member, and a stationary contact against which the movable contact is pressed for electric conductance. The slider is disposed to selectively close one of the three position circuits in accordance with a neutral position, forward position or reverse position and is provided with a compulsory separation means for moving the actuating members of the other position circuits so that the movable contacts may be compulsorily separated from the stationary contacts, thereby opening the other position circuits.

Such compulsory separation means may be formed on the sliding surface of the slider by the actuating member of each position circuit as a neutral recess, a forward recess and a reverse recess for allowing the actuating member to move in such a direction that the movable contact contacts the stationary contact only when any position circuit is closed, and as a projection for compulsorily moving the actuating member in such a direction that the movable contact is separated from the stationary contact.

With the configuration described above, when the slider moves in a link motion with the lever operation to any of the neutral position, the forward position and the reverse position, each actuating member also moves integrally with the slider. With the movement of the actuating member of the position circuit corresponding to the shift position, only the corresponding movable contact is adapted to encounter the stationary contact, while, as the actuating members of the other position circuits move in such a direction that each movable contact is separated from the corresponding stationary contact by the compulsory separation means of the slider, the movable contacts of these position circuits are compulsorily separated from the corresponding stationary contacts.

It is therefore possible to prevent the movable contact from causing the stationary contact to seize and to improve the endurance and the reliability of a switch, thereby ensuring positive shift switching.

It is to be noted that according to the present invention, the shift switch may be formed as a unit and detachably secured to a supporting member of the lever so that the lever and the shift switch can be interconnected for a link motion.

This arrangement provides ease of assembly. Also, since a mechanical section on one side of the lever can be separated from an electrical section consisting of the shift switch, a shock from the side of the lever is transmitted to the shift switch only with difficulty. When the shift switch is broken, it is necessary to replace only the broken switch shift. Thus, the replacement parts are minimized resulting in economies.

Further, if the lever and the shift switch are provided on a steering shaft of a steering wheel, a column-shift type converter is formed. Even in this case, since the shift switch is compactly made and its durability and reliability are improved, it is adequate for practical use.

The position circuits may also be disposed in a direction substantially perpendicular to the direction of the slider's movement.

With this arrangement, it is not necessary to allow for errors in the movement of the slider and it is thus possible to make the shift switch more compact.

Since the shift switch is compactly made, five instances of one neutral position, two forward positions, and two reverse positions may be provided.

The above and other objects, features and advantages of the present invention will become more apparent from the following description and the appended claims, taken in conjunction with the accompanying drawings.

BRIEF DESCRIPTION OF THE DRAWINGS

FIG. 6 is a view of a second embodiment (a first forward circuit and a second forward circuit) corresponding to FIG. 1;

FIG. 7 is a view of the second embodiment (a neutral circuit and a first reverse circuit) corresponding to FIG. 1; and FIG. 8 is a view of the second embodiment (a second reverse circuit) corresponding to FIG. 1.

DETAILED DESCRIPTION OF THE PREFERRED EMBODIMENT

A first embodiment of the present invention will be described with reference to the drawings attached hereto.

Figure 1:
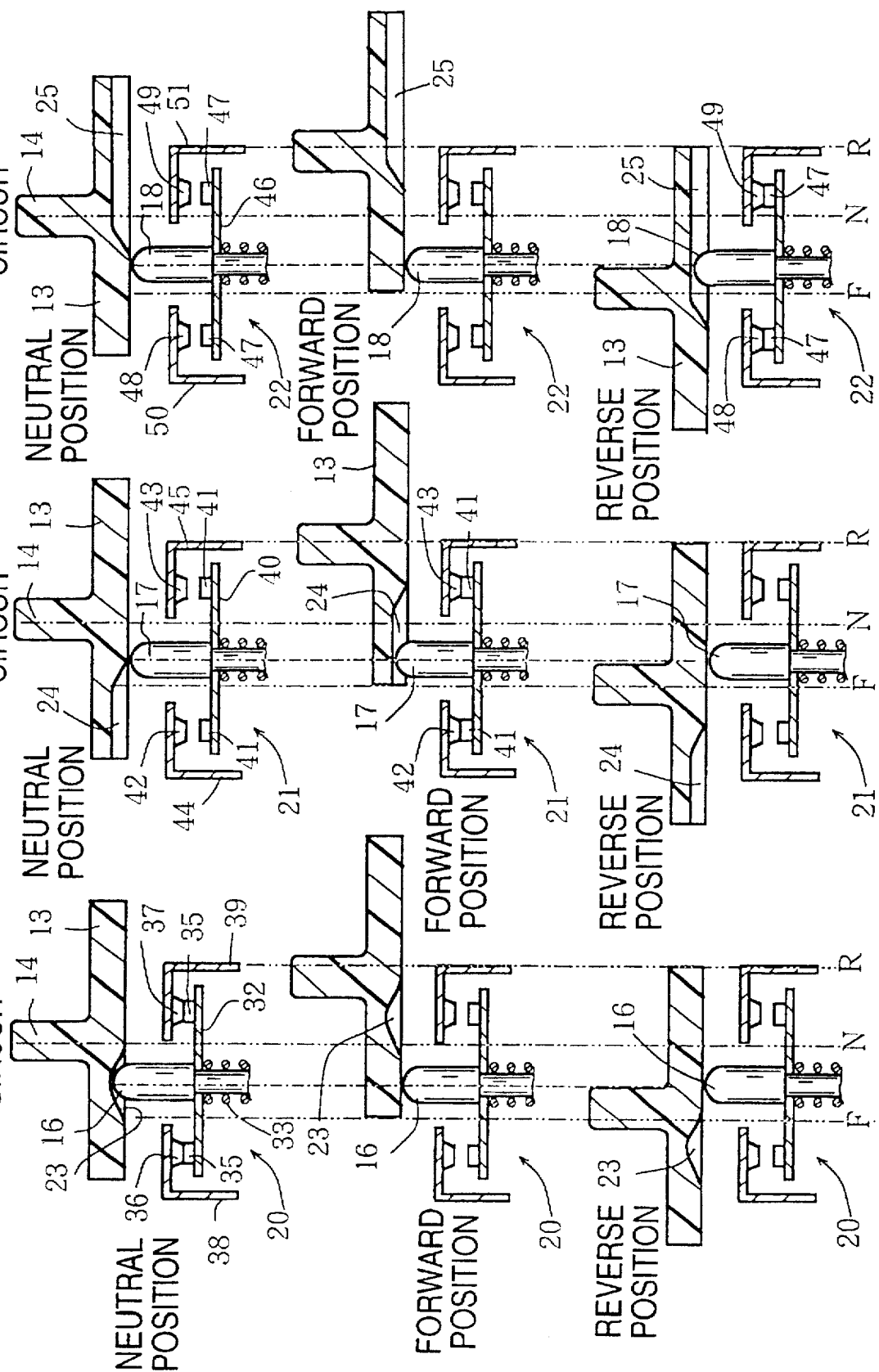
FIG. 1 is a view showing the movement of each switch in parallel.
Figure 2:
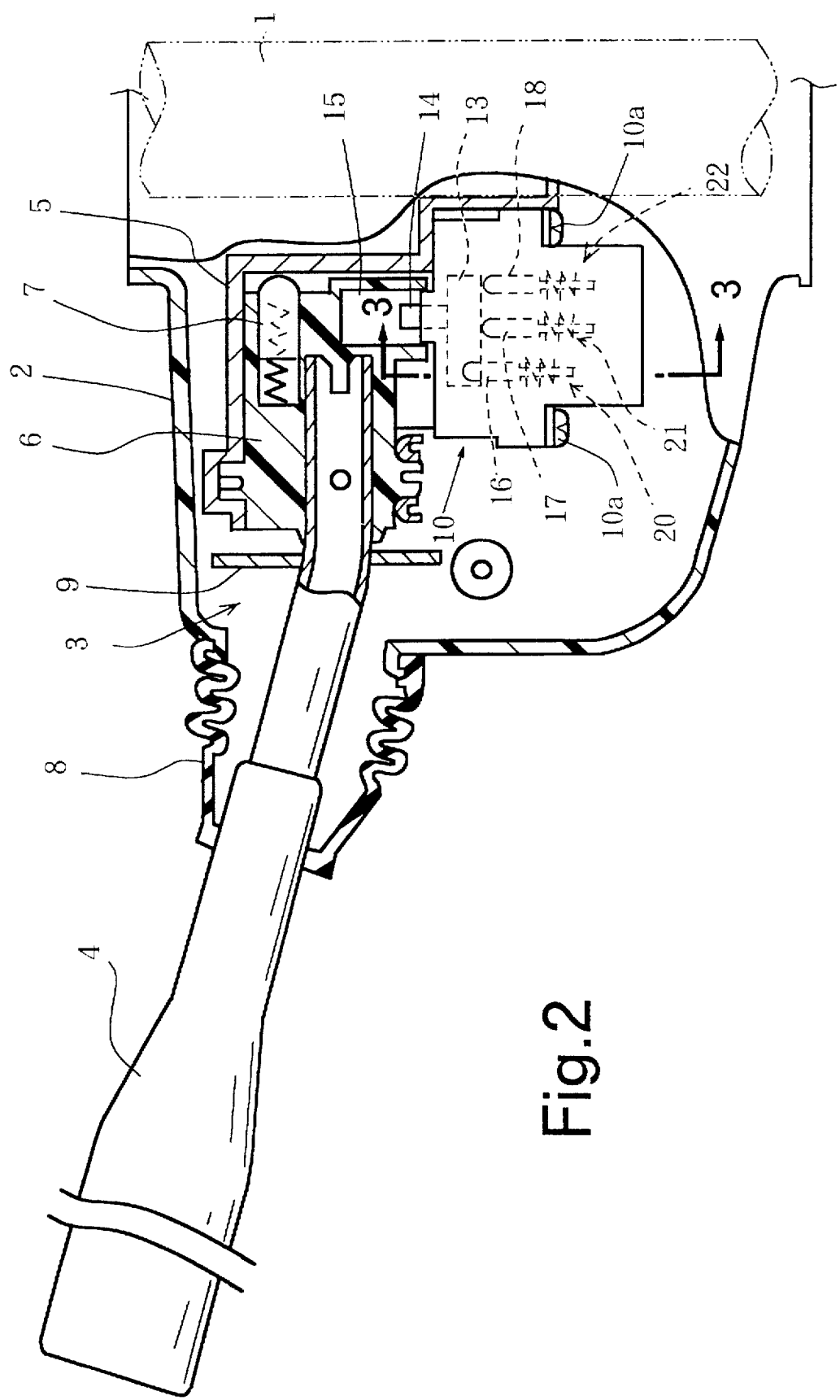
FIG. 2 is a partial sectional view of a combination switch exemplifying a preferred embodiment of the present invention.
Figure 3:
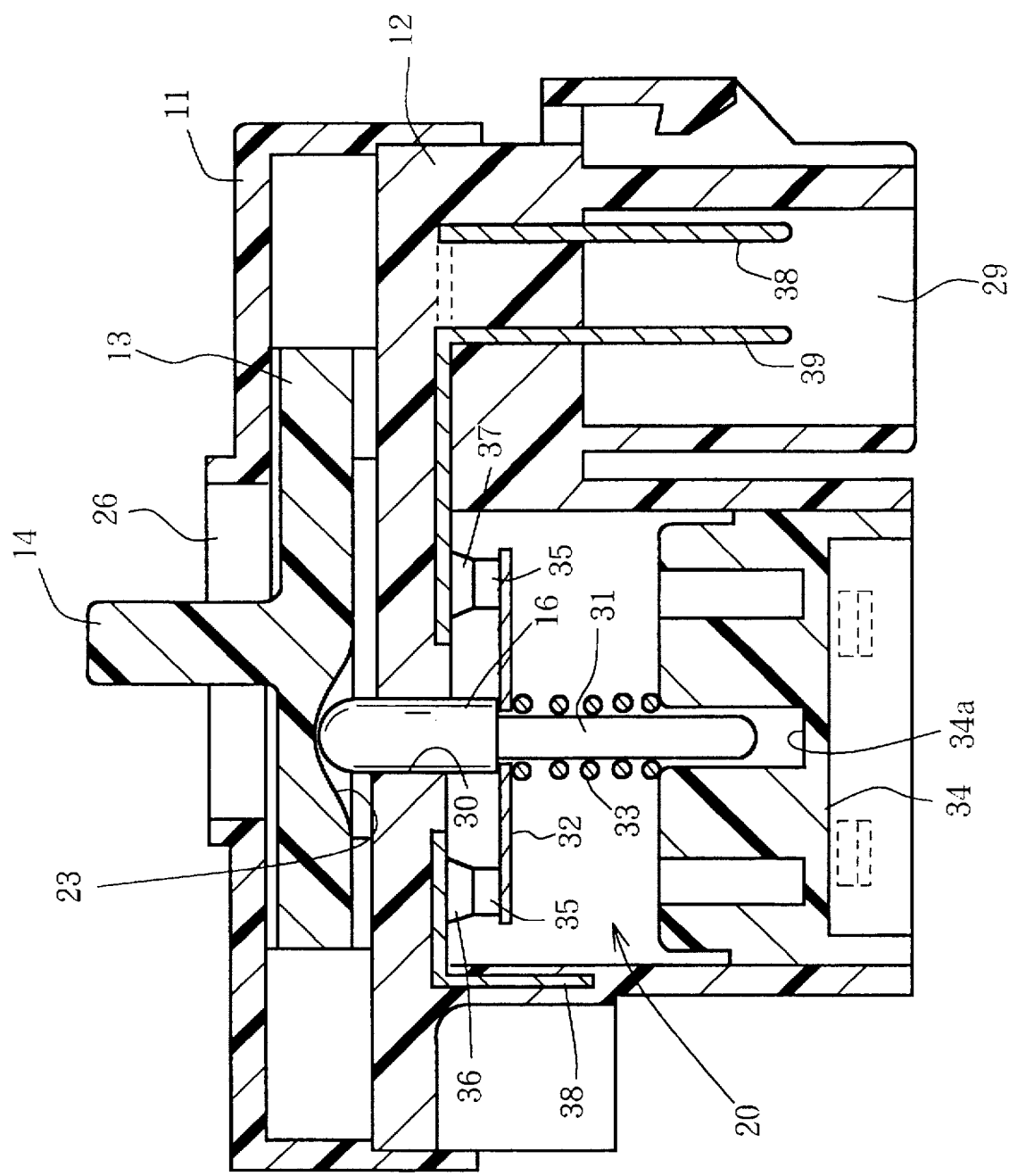
FIG. 3 is an enlarged sectional view of a shift switch taken along the line 3—3 of FIG. 2.
Figure 4:
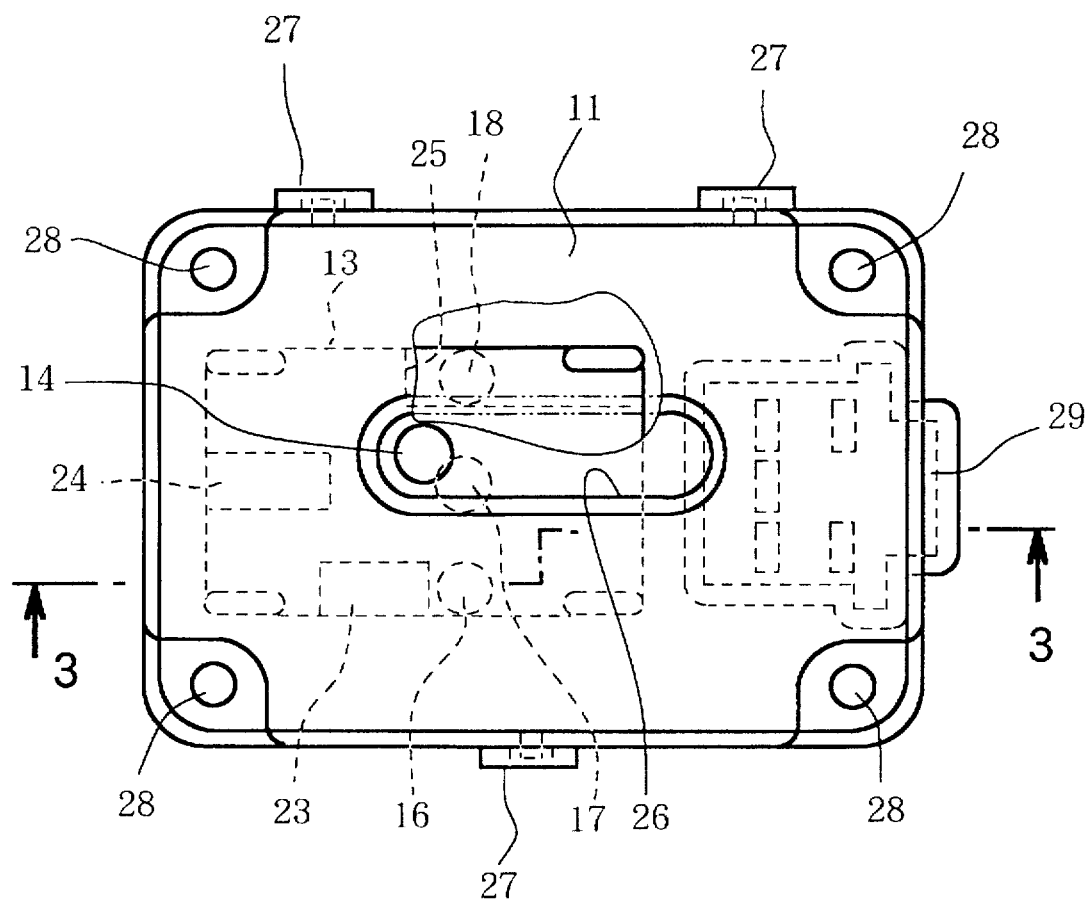
FIG. 4 is a plan view of the shift switch.
Figure 5:
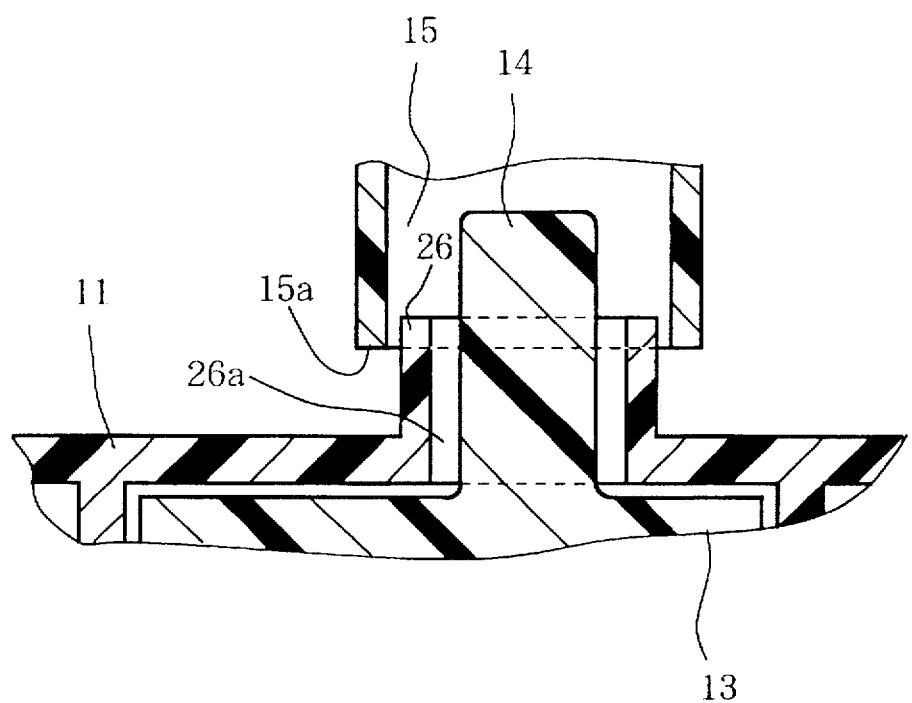
FIG. 5 is an enlarged sectional view of the essential parts of the shift switch.

FIG. 1 is a view explaining the movement of each contact corresponding to a shift position of a slider and FIG. 2 is a view showing the left half of a combination switch for a steering wheel for industrial vehicles exemplifying a switch of the present embodiment. FIG. 3 is a full sectional view of a shift switch taken along the line 3—3 of FIG. 2. FIG. 4 is a plan view of the shift switch seen from the top of FIG. 3 and FIG. 5 is an enlarged sectional view showing the connecting section of the shift switch with a side of the steering wheel.

Now, industrial vehicles are defined as those in which the operator's seat is not covered and include a forklift and other various construction and civil engineering vehicles. The non-covered type of operator's seat is one which is exposed to the elements to such an extent that rainwater contacts at least the steering wheel.

Referring first to FIG. 2, a combination switch 2 used in a steering shaft 1 of an industrial vehicle is provided with a shift switching device 3. The right half of the figure is omitted here, but a lever switch is provided for a lighting device as seen in an ordinary automobile.

One end of a shift lever 4 forming the shift switching device 3 is coupled to a holder 6 which is slidably supported with respect to a bracket 5 integrally formed with the steering shaft 1.

The shift lever 4 is pivotally disposed to select one of a neutral position, a forward position, and a reverse position within a plane perpendicular to the steering shaft 1. A holder 6 moves in response to the pivotal movement of the shift lever 4. The movement of the holder 6 is moderated by a click pin 7.

A rubber boot 8 is provided between the shift lever 4 and a cover of the combination switch 2 for waterproofing. The shift lever 4 is also provided with a collar 9 near the holder 6 for waterproofing.

Below the holder 6, a unitized shift switch 10 is detachably secured to a bracket 5 at four corners by screws 10a from the bottom of FIG. 2 although not obvious in FIG. 2. With this arrangement, attaching and detaching is simplified and expedite.

As shown in Figs. 3 and 4, the shift switch 10 is covered tightly with a lid 11 and a switch body 12, and the slider 13 housed therein is provided with a slider knob 14 on its central section.

The slider 13 is designed to link with the movement of the holder 6 so as to move between the lid 11 and the switch body 12 by a loose engagement of the slider knob 14 projecting through the lid 11 with a link recess 15 formed at a section of the holder 6.

As is apparent from FIG. 5, the lower end section 15a of the link recess 15 is disposed to overlap the circumference of a circular rib 26 surrounding a long opening 26a of the lid 11 formed to allow the slider knob 14 to move therein and the circumference of the slider knob 14 projecting through the circular rib 26, thereby forming a labyrinth mechanism to guard against water running along the shift lever 4.

On a side of the switch body 12, three actuating members 16, 17, and 18 are horizontally disposed in a straight line in a direction substantially perpendicular to the direction of the movement of the slider 13. These actuating members project to approach or retreat from the slider 13.

These actuating members are formed in a pin-shape, entering and exiting the switch body 12. Each member serves as an opening and closing member in a neutral circuit 20, a forward circuit 21, and a reverse circuit 22 which are position circuits.

As shown in FIG. 4, the top sections of the actuating members 16, 17, and 18 are arranged to slide in a neutral recess 23, a forward recess 24, and a reverse recess 25 respectively formed on the slider 13. The sliding surface of the slider 13 serves as a compulsory separation means.

In FIG. 4 sections 27 of the lid 11 engage the switch body 12. Tapped fastening holes, 28 are provided. A coupler 29 is adapted to face downward when the combination switch 2 is mounted thereon.

FIG. 3 shows a cross-section of the neutral circuit 20 when the shift lever 4 is in the neutral position, wherein the neutral recess 23 is formed to allow entry of the actuating member 16 only in the neutral position.

The actuating member 16 is allowed to freely enter and exit an opening 30 formed on the switch body 12, while one end of the leg section 31 with a smaller diameter passes through the central section of a conductive plate 32 and is inserted into a supporting hole 34a formed on a sealing member 34. The leg section 31 freely enters and exits the supporting hole 34a.

A compression coil spring 33 is provided between the conductive plate 32 and the sealing member 34 to activate the actuating member 16 toward the slider 13.

The conductive plate 32 is provided with movable contacts 35 which contact stationary contacts 36 and 37 formed on the side of the switch body 12 only when the actuating member 16 enters the neutral recess 23.

The stationary contact 36 is connected with a side of a power source (not shown) through a bus-bar terminal 38, while the stationary contact 37 is connected with a circuit for a starter motor of an engine (not shown) through a bus-bar terminal 39, whereby the starter motor can not start unless a speed change gear of a torque converter is in the neutral position.

The forward circuit 21 and the backward circuit 22 have almost the same structure as the neutral circuit 20. As shown in FIG. 1, the forward circuit is arranged so that when the actuating member 17 enters the forward recess 24 with a step formed on the slider 13 to progress from its substantially center section to one end, the movable contacts 41 formed on a conductive plate 40 engage the stationary contacts 42 and 43, respectively.

The stationary contact 42 is provided on a bus-bar terminal 44 on the side of a power supply, while the stationary contact 43 is provided on a bus-bar terminal 45 connected to a hydraulic control valve (not shown) on a forward side. When the forward circuit 21 is closed to move the hydraulic control valve on the forward side, a speed change gear of the torque converter is switched to the forward side. An electric current of 5A then flows between each of the contacts in the present embodiment.

On the other hand, the reverse circuit is arranged so that when the actuating member 18 enters the reverse recess 25 with a step formed on the slider 13 to progress from its substantially center section to the other end, the movable contacts 47 formed on a conductive plate 46 engage the stationary contacts 48 and 49, respectively.

The stationary contact 48 is provided on a bus-bar terminal 50 which is connected to a side of a power supply. The stationary contact 49 is provided on a bus-bar terminal 51 which is connected to the hydraulic control valve (not shown) on the backward side.

When the reverse circuit 22 is closed, the hydraulic control valve on the forward side switches the speed change gear of the torque converter to the reverse side. An electric current of 5A then flows between each of the contacts in the present embodiment.

Each section on the central side of the forward recess 24 and the backward recess 25 is positioned so that when the slider 13 is in the neutral position or in the shift position on the reverse side of the forward recess 24 and the reverse recess 25, the corresponding actuating members 17 and 18 do not enter therein.

Accordingly, each of the actuating members 16 through 18 is disposed so that its respective movable contact engages the corresponding stationary contact only when each actuating member is in the designated shift position. In the other cases, the movable contacts are compulsorily separated from the corresponding stationary contacts.

The operation of the shift switching device according to the present embodiment will now be described in detail. Referring to FIG. 1, in the neutral position as shown by the letter (A), the slider 13 is in the neutral position N. In this neutral circuit 20, the actuating member 16 enters the neutral recess 23 so that the starter motor is ready to be started. The other forward circuit 21 and reverse circuit 22 are compulsorily opened because the actuating members 17 and 18 have retreated from the corresponding forward recess 24 and reverse recess 25, respectively.

Referring now to the forward position as shown by the letter (B), the slider 13 is in the forward position F, wherein only in the forward circuit 21, the actuating member 17 enters the forward recess 24 and is on. In this case, the other neutral circuits 20 and forward circuit 22 are compulsorily opened because the actuation members 16 and 18 have retreated from the corresponding neutral recess 23 and backward recess 25, respectively.

In the reverse position as shown by the letter (C), the slider 13 is in the reverse position R, wherein only in the reverse circuit 22, the actuating member 18 enters the reverse recess 25 and is on, while in the other neutral circuit 20 and forward circuit 21, each actuating member 16 and 17 is compulsorily opened because each actuating member 16 and 17 has retreated from the corresponding neutral recess 23 and forward recess 24, respectively.

Accordingly, in the neutral circuit 20, the forward circuit 21 and the reverse circuit 22, since each contact can be compulsorily separated from every other shift position when it is off, it is possible to prevent seizure of the movable contact and the stationary contact wherein a relatively high amount of electricity flows. Thus, the durability and reliability of the shift switch 10 can be improved.

Further, since each position circuit is disposed in a straight line in a direction substantially perpendicular to the direction of the movement of the slider 13, the switch can be compactly made. The shift switching operation can also be performed by the shift lever 4 with a relatively narrow pivotal area. Therefore, it is also possible to change the floorshift converter to a column-shift type converter by attaching the shift switch 10 to the steering shaft 1.

As described above, the shift switch 10 can be formed as a unit. In this case, the unit can be detachably secured to the side of the steering shaft by simply fastening screws at the four corners. When the shift switch 10 is broken, only this shift switch needs to be replaced. A minimum number of the parts need replacing, resulting in economies.

In addition, electric components are concentrated in the shift switch 10 and these are connected to the shift lever side only by the slider knob 14 and the link recess 15. It is therefore possible to clearly separate the mechanical section from the electric section, making it difficult for vibration produced on the side of the shift lever 4 to be transmitted to the shift switch 10 side. Breakage can therefore be prevented.

The shift switch 10 is sealed by the lid 11 and the switch body 12. For waterproofing, a rubber boot 8 is provided between the shift lever 4 and the combination switch 2, and a collar 9 between the shift lever 4 and the shift switch 10, respectively. A labyrinth seal mechanism is provided between the link recess 15 and the slider knob 14 and the circular rib 26. Also, the coupler 29 is provided facing downward. With this arrangement, the device can be fully protected from rainwater even if the shift switching device is secured to the steering wheel section of an industrial vehicle which is often exposed to rain.

A second embodiment of the present invention will now be described with reference to Figs. 6 through 8. The second embodiment is a shift switching device for a torque converter consisting of five instances of one neutral position, two forward positions, and two reverse positions. The other points are the same as those of the first embodiment. Accordingly, the functional sections common to the first embodiment are given the same reference numerals.

Figs. 6 through 8 are views of the second embodiment corresponding to FIG. 1. As is apparent from FIG. 6, a forward movement is provided with a first forward circuit 121 and a second forward circuit 120. When the first forward circuit 121 is closed, a hydraulic control valve (not shown) for the first forward movement is actuated to switch a speed change gear of the torque converter to forward movement with a relatively large torque. Also, when the second forward circuit 120 is closed, a hydraulic control valve (not shown) of the second forward movement is actuated to switch a speed change gear of the torque converter to forward movement with a relatively small torque. In FIG. 7, a neutral circuit 122 is connected to a circuit for a starter motor of an engine as shown in the first embodiment, wherein the starter motor can not start unless the speed change gear is in the neutral position.

As is apparent from Figs. 7 and 8, a reverse movement, like the forward movement, is also provided with a first reverse circuit 123 with a relatively large torque and a second reverse circuit 124 with a relatively small torque. A neutral circuit 122 is also provided between the forward and reverse movement. These circuits are provided with actuating members 100 through 104, respectively.

The slider 113 is provided with a second forward recess 140, a first forward recess 141, a neutral recess 142, a first reverse recess 143 and second reverse recess 144, respectively. The letters (A) through (E) of FIGS. 6 through 8 show the position of a shift lever 4, i.e. the position of the slider 113.

As is apparent from these figures, because there are five shift positions in the second embodiment, each circuit is closed only when each actuating member 100 through 104 is actuated to assume its designated shift position, while in the other four positions the circuits are set to be compulsorily opened. For example, when the shift lever 4 is in the first forward position, as shown in (B) of Figs. 6 through 8, only the first forward circuit is closed, while the other circuits are compulsorily opened.

The present invention is not confined to the embodiments described above, but may be embodied or practiced in various other ways without departing from the spirit or essential character thereof. For example, the invention may be applied to a shift switching device having two or more positions, wherein the shift switching device is provided with four positions consisting of two forward positions, one neutral position, and one reverse position.

The invention being thus described, it will be obvious that the same may be varied as a departure from the spirit and scope of the invention, and all such modifications as would be obvious to one skilled in the art are intended to be included within the scope of the following claims.

What is claimed is:

1. A shift switching device for a torque converter comprising:
    a lever for shifting the output of the torque converter to at least a neutral forward or reverse movement;
    a slider disposed to link and to move linearly with the lever;
    at least three position circuits adapted to be closed or opened by the movement of the slider and being independent in the neutral, forward or reverse movement;
    each position circuit having an actuating member which is confined to move in a rectangular movement of the slider moving direction linking with the slider, a movable contact which moves integrally with the actuating member, and a stationary contact against which the movable contact is pressed for electric conductance;
    the slider being disposed to selectively close one of the three position circuits in accordance with the neutral position, forward position, or reverse position and provided with a compulsory separation means for moving the actuating members of the other position circuits so that the movable contacts may be compulsorily separated from the stationary contacts, thereby opening the other position circuits;
    wherein the compulsory separation means comprises a neutral recess, a forward recess, and a reverse recess formed on the sliding surface of the slider by the actuating member of each position circuit for allowing the actuating member to move in a direction to engage the stationary contact only when any position circuit is closed, and a projection, in the other case, for allowing the movable contact to compulsorily move in a direction to disengage.

2. The shift switching device for a torque converter according to claim 1, wherein a shift switch is formed as a unit and detachably secured to a supporting member of the lever so that the shift switch may link with the lever.

3. The shift switching device for a torque converter according to claim 1, wherein the shift switch is secured to a steering shaft of a steering wheel to serve as a column-shift type.

4. The shift switching device for a torque converter according to claim 1, wherein each position circuit is disposed in a direction substantially perpendicular to the direction of the movement of the slider.

5. The shift switching device for a torque converter according to claim 1, wherein five position circuits are provided comprising one neutral position, two forward positions, and two reverse positions.

6. The shift switching device according to claim 1, wherein said neutral recess is formed in a central position along a side of said slider, said forward recess is formed in a forward portion of said slider and said rear recess is formed in a rear portion of said slider.

7. The shift switching device according to claim 1, wherein when the actuating member of the position circuit for the neutral position is actuated, the forward position and the reverse position are not actuated.

8. The shift switching device according to claim 1, wherein when the actuating member of the position circuit for the forward position is actuated, the neutral position and the rear position are not actuated.

9. The shift switching device according to claim 1, wherein when the actuating member of the position circuit for the rear position is actuated, the neutral position and the forward position are not actuated.

* * * * *